(12) United States Patent
Ohmura (10) Patent No.: US 10,351,130 B2
(45) Date of Patent: *Jul. 16, 2019

(54) VEHICLE CONTROL SYSTEM

(71) Applicant: MAZDA MOTOR CORPORATION, Hiroshima (JP)

(72) Inventor: Hiroshi Ohmura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 162 days.

This patent is subject to a terminal disclaimer.

(21) Appl. No.: 15/515,080

(22) PCT Filed: Sep. 6, 2016

(86) PCT No.: PCT/JP2016/076172
§ 371 (c)(1),
(2) Date: Mar. 28, 2017

(87) PCT Pub. No.: WO2018/047232
PCT Pub. Date: Mar. 15, 2018

(65) Prior Publication Data
US 2018/0345956 A1    Dec. 6, 2018

(51) Int. Cl.
*B60W 30/09* (2012.01)
*B60W 30/095* (2012.01)
(Continued)

(52) U.S. Cl.
CPC .......... *B60W 30/09* (2013.01); *B60W 30/095* (2013.01); *B60W 30/143* (2013.01);
(Continued)

(58) Field of Classification Search
CPC .... B60W 30/09; B60W 30/12; B60W 30/162; B60W 2520/12; B60W 2540/10; B60W 2540/18
(Continued)

(56) References Cited

U.S. PATENT DOCUMENTS 9,945,951 B2 * 4/2018 Tobeta .................. G01S 17/936
2013/0293395 A1   11/2013 Ohama et al.
2015/0210279 A1    7/2015 Agnew et al.

FOREIGN PATENT DOCUMENTS

EP    2 648 172 A1    10/2013
EP    2 902 290 A1     8/2015
(Continued)

OTHER PUBLICATIONS

International Search Report issued in PCT/JP2016/076172; dated Oct. 18, 2016.

(Continued)

*Primary Examiner* — Gertrude Arthur Jeanglaude
(74) *Attorney, Agent, or Firm* — Studebaker & Brackett PC (57) ABSTRACT

An ECU 10 mounted on a controlled vehicle is configured to carry out a control for; detecting an object vehicle 3, determining a speed distribution area 40 which defines a distribution of an allowable upper limit of a relative speed of the controlled vehicle 1 with respect to the object vehicle, and executing an avoidance control (S14) for restricting the relative speed of the controlled vehicle 1 with respect to the object vehicle from exceeding the allowable upper limit in the speed distribution area 40. The speed distribution area 40 is determined such that the same allowable upper limit extends from an area on one side of the object vehicle 3 in a lateral direction through an area between the controlled vehicle 1 and the object vehicle 3 to an area on the other side of the controlled vehicle 1 in a lateral direction.

10 Claims, 8 Drawing Sheets

(51) Int. Cl.
*B60W 30/14* (2006.01)
*B60W 30/12* (2006.01)
*B60W 30/16* (2012.01)

(52) U.S. Cl.
CPC ........... *B60W 30/12* (2013.01); *B60W 30/162* (2013.01); *B60W 2520/10* (2013.01); *B60W 2520/12* (2013.01); *B60W 2540/10* (2013.01); *B60W 2540/18* (2013.01); *B60W 2550/10* (2013.01); *B60W 2550/302* (2013.01); *B60W 2550/308* (2013.01); *B60W 2750/302* (2013.01)

(58) Field of Classification Search
USPC .......................................................... 701/23
See application file for complete search history.

(56) References Cited

FOREIGN PATENT DOCUMENTS

| | | |
|---|---|---|
| JP | 2011-051547 A | 3/2011 |
| JP | 2015-155295 A | 8/2015 |
| WO | 2016/024318 A1 | 2/2016 |

OTHER PUBLICATIONS

Written Opinion issued in PCT/JP2016/076172; dated Oct. 18, 2016.
The extended European search report issued by the European Patent Office dated Apr. 2, 2019, which corresponds to European Patent Application No. 16915652.8-1012 and is related to U.S. Appl. No. 15/515,080.

* cited by examiner

VEHICLE CONTROL SYSTEM

TECHNICAL FIELD

The present invention relates to a vehicle control system, and more particularly to a vehicle control system for assisting a safe travelling of a vehicle.

BACKGROUND ART

Conventionally, a motor vehicle has a plurality of safe driving assist systems which are mounted thereon and include a lane keeping assist system and/or an automated cruise system. In such systems, an automatic brake control and/or a steering assist control or the like are used respectively. Therefore, respective ones of a brake request signal for performing the automatic brake control, and a steering request signal for performing the steering assist control may be issued from respective ones of the systems. For example, the brake request signal may be issued from different systems at different timings. In such case, one of the request signals in the plurality of request signals may be prioritized over the others in the plurality of request signals (for example, refer to Patent Document 1).

CITATION LIST

Patent Document

Patent Document 1: Japanese Laid-Open Patent Publication: JP2011-051547A

SUMMARY OF INVENTION

Technical Problem

However, since there is a high possibility that the safe driving assist system may become more complicated in the future, there may be a risk in such a complicated system that the safe driving assist system may not function efficiently as a whole only by giving priority to one of such request signals.

The present invention has been made to solve the above problem, and an object thereof is to provide a vehicle control system which may efficiently perform a vehicle control for safe driving assistance.

Solution to the Technical Problem

In order to achieve the above object, the present invention provides a vehicle control system mounted on a controlled vehicle, the system being configured to carry out a control for detecting an object vehicle which presents ahead of the controlled vehicle, determining a speed distribution area which defines a distribution of an allowable upper limit of a relative speed of the controlled vehicle with respect to the object vehicle in the travelling direction of the vehicle, and executing an avoidance control for restricting the relative speed of the controlled vehicle with respect to the object vehicle from exceeding the allowable upper limit in the speed distribution area, wherein the speed distribution area has a first speed distribution area defined such that the same allowable upper limit extends from an area on the one side of the object vehicle in a lateral direction through an area between the controlled vehicle and the object vehicle and then to an area on the other side of the controlled vehicle in a lateral direction.

In the vehicle control system in accordance with the present invention having the above features, the speed distribution area is determined between the detected object vehicle and the controlled vehicle. The speed distribution area has the first speed distribution area defined such that the same allowable upper limit of relative speed extends from the area on the one side of the object vehicle in the lateral direction through the area between the controlled vehicle and the object vehicle to the area on the other side of the controlled vehicle in the lateral direction. Then, according to the present invention, the relative speed of the vehicles is controlled such that it is restricted from exceeding the allowable upper limit determined in the speed distribution area.

Therefore, the vehicle has an appropriate allowable upper limit determined for an area on the other side of the vehicle in the lateral direction according to its position, has an appropriate allowable upper limit determined when the controlled vehicle travels behind the object vehicle in an area between itself and the object vehicle, and has an appropriate allowable upper limit determined when the vehicle travels one side of the object vehicle in an area on the one side of the object vehicle in the lateral direction.

As such, the present invention is configured to limit the allowable upper limit in accordance with the first speed distribution area set to extend from the area on the one side of the object vehicle in the lateral direction through the area between the controlled vehicle and the object vehicle to the area on the other side of the controlled vehicle in the lateral direction, so that it is possible to provide a safe driving assistance through a simple and efficient speed control.

In the vehicle control system of the present invention, preferably, the first speed distribution area is determined such that, in the area on the one side of the object vehicle, the allowable upper limit is made lower as the lateral distance from the object vehicle becomes smaller, in the area between the controlled vehicle and the object vehicle, the allowable upper limit is made lower as a forward or rearward distance from the object vehicle becomes smaller, and in the area on the other side of the vehicle, the allowable upper limit is made lower as the lateral distance from the vehicle becomes larger.

In the vehicle control system in accordance with the present invention having the above features, when the controlled vehicle travels further away from an area on the one side of the object vehicle, a larger relative speed is allowed, but when the controlled vehicle travels closer to an area on the one side of the object vehicle, the vehicle speed is controlled to make the relative speed lower. In addition, when the controlled vehicle travels further away in forward or rearward direction from the object vehicle, a larger relative speed is allowed, but when the controlled vehicle travels closer to the object vehicle in forward or rearward direction, the vehicle speed is limited to make the relative speed lower. Further, when the controlled vehicle travels under a situation where the other side of the object vehicle has a wider area, a larger relative speed is allowed, but when the controlled vehicle travels under a situation where the other side of the vehicle has a narrower area, the vehicle speed is controlled by making the relative speed lower.

As such, according to the present invention, the allowable upper limit for the relative speed of the vehicles is limited according to the position associated with the area on the other side of the controlled vehicle in the lateral direction or the distance from the object vehicle in forward or rearward and/or the lateral direction, so that it is possible to provide the safe driving assistance through a simple and efficient speed control.

In the vehicle control system of the present invention, preferably, in the avoidance control, a speed and/or a steering direction of the controlled vehicle is changed such that the relative speed of the vehicles in the speed distribution area does not exceed the allowable upper limit.

In the vehicle control system in accordance with the present invention having the above features, in order to control the relative speed of the vehicles so as not to exceed the allowable upper limits which are determined in the speed distribution area, the system may be configured to change (decelerate) the speed itself of the controlled vehicle, or may alternatively be configured to change the travelling path of the controlled vehicle by changing the steering direction so that the controlled vehicle is passed an area with a larger allowable upper limit, or may be configured to change both of the speed and the steering direction.

In the vehicle control system of the present invention, preferably, in the avoidance control, a route of the vehicle is calculated based on the speed distribution areas.

In the vehicle control system in accordance with the present invention having the above features, it is possible for the controlled vehicle to travel on a safe route with respect to the object vehicle.

In the vehicle control system of the present invention, preferably, the speed distribution area is determined such that the allowable upper limit is zero at a position apart from the object vehicle by a predetermined safe distance.

In the vehicle control system in accordance with the present invention having the above features, the controlled vehicle can only approach the object vehicle up to a position apart from the object vehicle by a safe distance. Thus, according to the present invention, even if the object vehicle suddenly moved in a direction approaching the controlled vehicle, it is possible to prevent the controlled vehicle and the object vehicle from contacting with each other.

In the vehicle control system of the present invention, preferably, the speed distribution area further comprises a second speed distribution area defined such that the same allowable upper limit extends from an area on the other side of the object vehicle in a lateral direction through an area between the controlled vehicle and the object vehicle to an area on the one side of the controlled vehicle in a lateral direction.

In the vehicle control system in accordance with the present invention having the above features, the speed distribution area further has the second speed distribution area defined such that the allowable upper limit extends from the area on the other side of the object vehicle in the lateral direction to the area on the one side of the controlled vehicle in the lateral direction, in addition to the first speed distribution area, so that the allowable upper limit is determined on both sides of the controlled vehicle and the object vehicle. Therefore, the control of vehicle speed with respect to the object vehicle is possible in either lateral directions of the controlled vehicle.

In the vehicle control system of the present invention, preferably, the second speed distribution area is determined such that, in the area on the other side of the object vehicle, the allowable upper limit is made lower as a lateral distance from the object vehicle is smaller, in the area between the controlled vehicle and the object vehicle, the allowable upper limit is made lower as a forward or rearward distance from the object vehicle is smaller, and in the area on the one side of the controlled vehicle, the allowable upper limit is made lower as a lateral distance from the controlled vehicle is larger.

In the vehicle control system in accordance with the present invention having the above features, the allowable upper limit for the relative speed between the vehicles is limited according to the position associated with an area on the other side of the controlled vehicle in the lateral direction or the distance from the object vehicle in forward or rearward direction and/or the lateral direction, so that it is possible to provide the safe driving assistance through a simple and efficient speed control. In addition, the speed distribution area is determined on both sides of the controlled vehicle and the object vehicle, so that, for example, if controlling the speed and/or the steering of the controlled vehicle such that the controlled vehicle is always positioned inside the predetermined speed distribution area, it becomes possible to conduct a follow-up control for having the controlled vehicle automatically follow the object vehicle.

In the vehicle control system of the present invention, it is preferable to construct such that, in the avoidance control, the controlled vehicle is restricted from exceeding the allowable upper limit of the smaller one of the limits defined by the first speed distribution area and the second speed distribution area.

In the vehicle control system in accordance with the present invention having the above features, the controlled vehicle is restricted from exceeding the allowable upper limit of the smaller one of the limits defined by the first speed distribution area and the second speed distribution area, so that it is possible to provide a safer driving assistance.

In the vehicle control system of the present invention, preferably, when an input trigger is detected, and either one of the settings of the first speed distribution area or the second speed distribution area is canceled depending on a content of the trigger.

In the vehicle control system in accordance with the present invention having the above features, either one of the settings of the first speed distribution area and the second speed distribution area is canceled depending on the content of the trigger, so that the restriction by the allowable upper limit is removed on the one side or the other side of the vehicle, and thus it is possible for the vehicle to travel at a larger relative speed in the area on the one side or the other side of the vehicle. This is useful, for example, when the driver of the controlled vehicle intends to pass or overtake the object vehicle.

In the vehicle control system of the present invention, preferably, the trigger includes at least one of an operation of a direction indicator by a driver of the vehicle, an accelerator operation, a steering operation, and a lateral movement of the object vehicle with respect to the vehicle for more than a predetermined distance.

Meritorious Effect of Invention

According to the present invention it is possible to provide the vehicle control system which may efficiently perform the vehicle control for the safe driving assistance.

DESCRIPTION OF EMBODIMENTS

Figure 1:
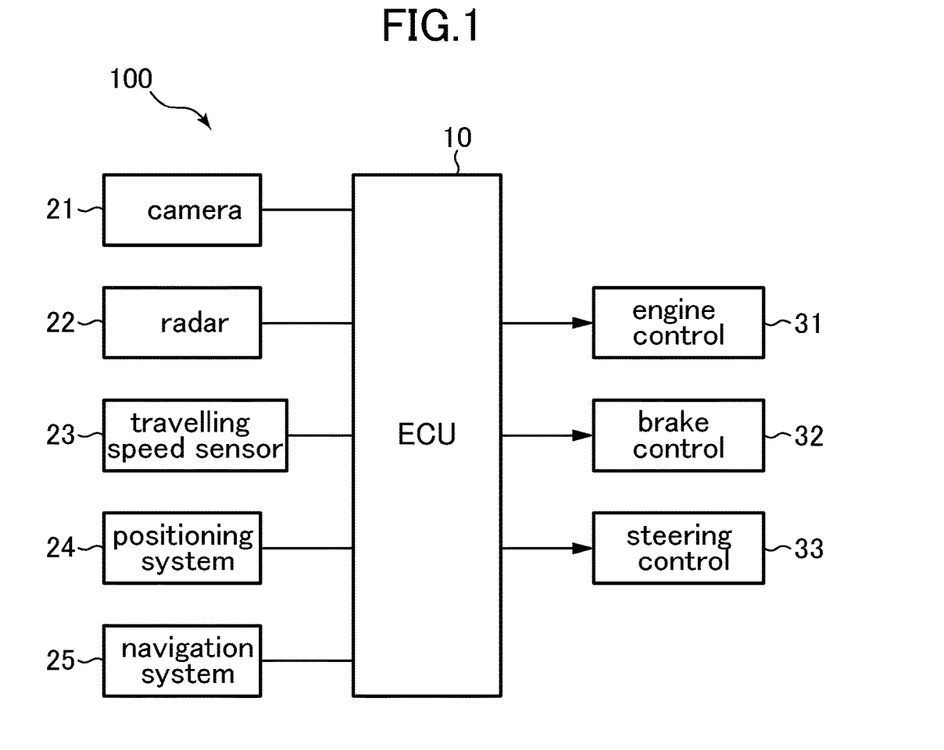
FIG. 1 is a block diagram of a vehicle control system according to one embodiment of the present invention.

With reference to the accompanying drawings, a vehicle control system according to one embodiment of the present invention will now be described. First, with reference to FIG. 1, the configuration of the vehicle control system will be described. FIG. 1 is a block diagram of the vehicle control system.

As depicted in FIG. 1, an engine control system 100 is mounted on a controlled vehicle 1 (refer to FIG. 3), and comprises a vehicle control system (ECU) 10, a plurality of sensors, and a plurality of control systems. The plurality of sensors includes a car-mounted camera 21, a millimeter-wave radar 22, a vehicle speed sensor 23, a positioning system 24 and a navigation system 25. In addition, the plurality of control systems includes an engine control system 31, a brake control system 32 and a steering control system 33.

The ECU 10 is configured by a computer comprising a CPU, a memory for storing various kinds of programs, and an input/output device or the like. The ECU 10 is configured to allow for, based on the signals received from the plurality of sensors, outputting respective ones of request signals to the engine control system 31, the brake control system 32 and the steering control system 33 in order to appropriately activate respective ones of engine system, a brake system and a steering system. Thus, the ECU 10 can be described that it functionally comprises a data acquisition part, an object detection part, a position and relative speed calculation part, a speed distribution area determining part, a route calculation part and an avoidance control executing part.

The car-mounted camera 21 takes images around the controlled vehicle 1 and outputs the taken image data. The ECU 10 specifies an object (for example, a preceding vehicle) based on the image data. Further, the ECU 10 can specify a travelling direction or a front-back direction of the object from the image data.

The millimeter-wave radar 22 is a measurement device for measuring the position and speed of the object, which transmits an electric wave (transmission wave) toward a forward area of the controlled vehicle 1 and receives a reflection wave which is produced as a result of the transmission wave being reflected at the object. Then, the millimeter-wave radar 22 measures the distance between the controlled vehicle 1 and the object (for example, the inter-vehicular distance) and/or a relative speed of the object with respect to the controlled vehicle 1 based on the transmission wave and a reception wave. Further, according to the present embodiment, it is possible to substitute the millimeter-wave radar 22 by a laser radar, an ultrasonic sensor or the like for measuring the distance and/or the relative speed with respect to the object. In addition, it is possible to configure a position and speed measurement device using the plurality of sensors.

The vehicle speed sensor 23 functions to calculate an absolute speed of the controlled vehicle 1.

The positioning system 24 comprises a GPS system and/or a gyro system, which functions to calculate the position of the controlled vehicle 1 (current vehicle position information).

The navigation system 25 has map information stored therein, and can provide the map information to the ECU 10. The ECU 10 specifies roads, traffic signals, structural objects or the like existing around the controlled vehicle 1 (particularly, a forward area of the travelling direction) based on the map information and the current vehicle position information. In addition, the ECU 10 may specify a scarp, a trench, a hole or the like based on the map information, which are difficult to be specified from the image data by the car-mounted camera 21. The map information may be stored in the ECU 10.

The engine control system 31 constitutes a controller for controlling an engine of the controlled vehicle 1. The ECU 10 outputs an engine output change request signal to the engine control system 31 for requesting a change in the engine output when the controlled vehicle 1 needs to be accelerated or decelerated.

The brake control system 32 constitutes a controller for controlling a braking device of the controlled vehicle 1. The ECU 10 outputs a brake request signal to the brake control system 32 for requesting a braking force to be applied to the controlled vehicle 1 when the controlled vehicle 1 needs to be decelerated.

The steering control system 33 constitutes a controller for controlling a steering device of the controlled vehicle 1. The ECU 10 outputs a steering direction change request signal to the steering control system 33 for requesting a change in the steering direction when the travelling direction of the controlled vehicle 1 needs to be changed.

Subsequently, a speed control of the vehicle control system 100 according to the present embodiment will be described.

Generally, when catching up with, or passing (or overtaking) an object (for example, a preceding vehicle, a parked vehicle, a guardrail or the like) on or near a road, a driver of the travelling vehicle keeps a predetermined distance or space between the travelling vehicle and the object in the travelling direction, and decelerates. Specifically, in order to avoid dangers such as a case where the preceding vehicle suddenly changes a path, where a pedestrian comes out from a blind spot of a road, and/or where a door of the parked vehicle opens, the relative speed with respect to the object is made lower as the distance with respect to the object becomes smaller.

In addition, generally, when the travelling vehicle 1 is approaching the preceding vehicle from behind, the driver of the travelling vehicle adjusts the speed (relative speed) depending on the distance between the two vehicles (longitudinal distance) along the travelling direction. Specifically, as long as the distance between the two vehicles is large, an approaching speed (relative speed) is maintained high, but when the distance between the two vehicles becomes small, the approaching speed is made low. Further, the relative speed between the traveling vehicle and the object becomes zero at a predetermined distance between the vehicles. This applies not only to a case where the object is the preceding vehicle, but also to a case where the object is a parked vehicle, a guardrail or the like.

As described above, the driver drives the vehicle considering the relationship of the distance between the object and the vehicle (including the lateral distance and longitudinal distance), and the relative speed so as to avoid dangers.

Figure 2:
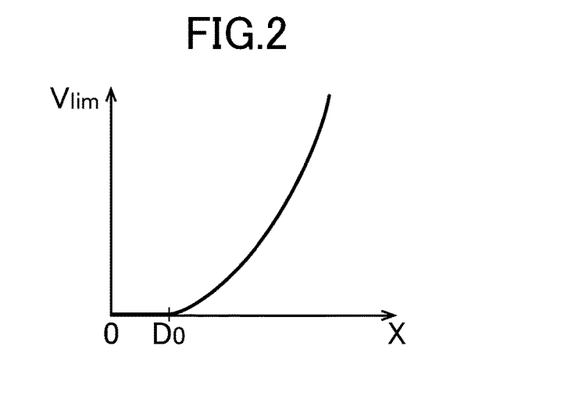
FIG. 2 is an explanatory diagram depicting a relationship between an allowable upper limit of relative speed and a clearance with respect to an object, of a vehicle control system according to one embodiment of the present invention.

FIG. 2 is an explanatory diagram depicting a relationship between an allowable upper limit of relative speed with respect to the object and a distance (clearance) with respect to the object according to one embodiment of the vehicle control system 100 of the present invention. As depicted in FIG. 2, when the controlled vehicle 1 travels at a certain absolute speed, the allowable upper limit $V_{lim}$ determined with respect to the object is 0 (zero) km/h under a distance X below $D_0$ (a safe distance), and increases as the distance X is increased beyond a value $D_0$ as a quadratic function ($V_{lim}=k(X-D_0)^2$ Provided $X \geq D_0$). Specifically, for ensuring safety, the relative speed of the controlled vehicle 1 is set to zero when the distance X is less than $D_0$. By contrast, when the distance is of a value at or larger than $D_0$, the controlled vehicle 1 may be allowed to travel with a larger relative speed as the clearance becomes larger.

In the example of FIG. 2, the allowable upper limit with respect to the object is defined by $V_{lim}=f(X)=k(X-D_0)^2$. Here, the character k represents a gain factor related to a rate of change in $V_{lim}$ with respect to X, which is set depending on types or the like of the object.

Further, in the present embodiment, $V_{lim}$ is defined as including the safe distance and according to a quadratic function of X, but the present invention is not limited thereto, and $V_{lim}$ may not include the safe distance and may be defined by another function (for example, a linear function or the like). In addition, with reference to FIG. 2, the allowable upper limit $V_{lim}$ in the lateral direction of the object has been described, but it is possible to determine the allowable upper limit $V_{lim}$ for all of radial directions including the longitudinal direction of the object. In such case, the factor k and the safe distance $D_0$ may be determined depending on the directions from the vehicle to the object.

Considering the allowable upper limit $V_{lim}$ as described above, according to the present embodiment, the controlled vehicle 1 is provided with a system which is configured such that a two-dimensional distribution area (individual speed distribution area 40) is determined around the object (over a lateral area, a rearward area, and a forward area) for defining allowable upper limits of the relative speeds in the travelling direction of the controlled vehicle 1 with respect to the object (the preceding vehicle, the parked vehicle, pedestrian, guardrail or the like) detected from the controlled vehicle 1.

Figure 3:
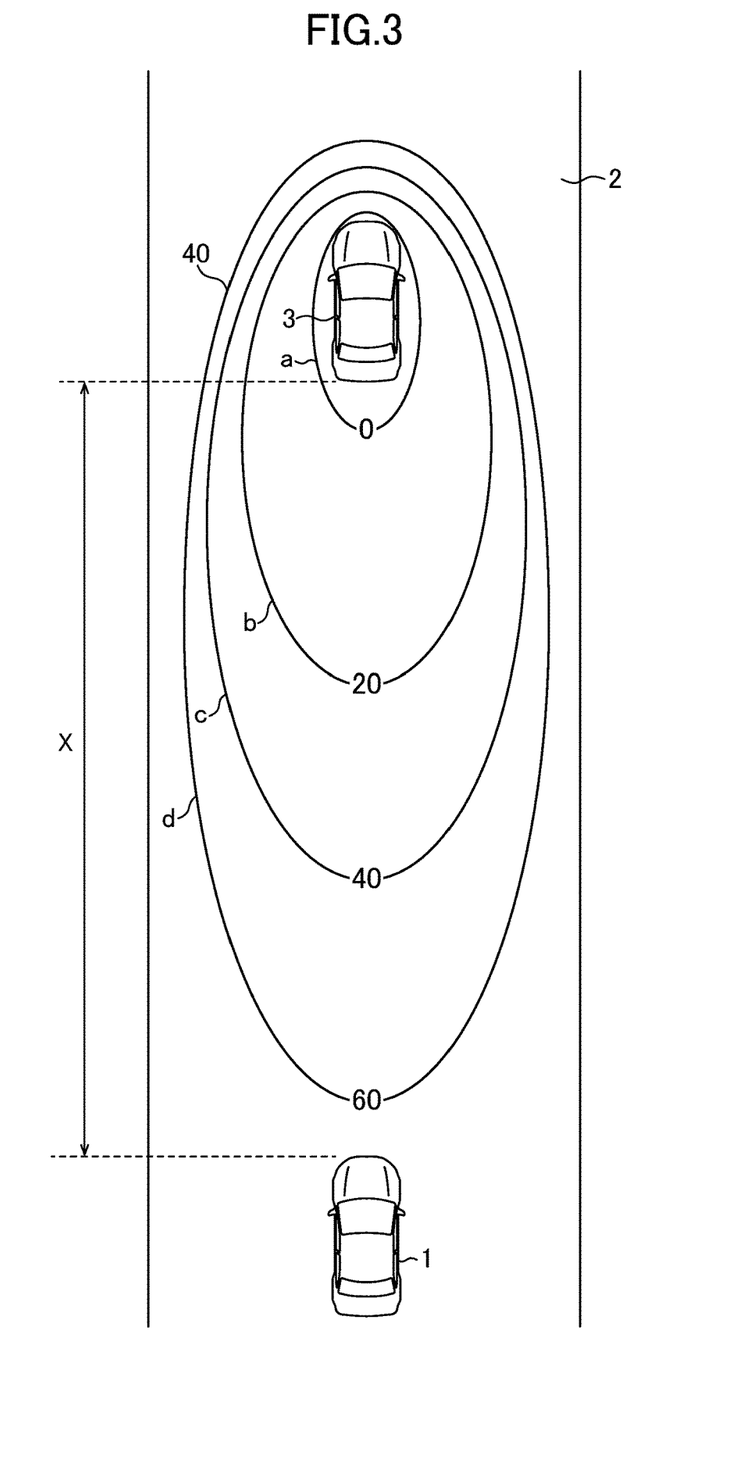
FIG. 3 is an explanatory diagram of a individual speed distribution area determined with respect to a preceding vehicle when a vehicle control system according to one embodiment of the present invention is under normal travelling condition.

FIG. 3 is an explanatory diagram of an individual speed distribution area determined with respect to the preceding vehicle when the vehicle control system according to one embodiment of the present invention is under normal travelling condition. In the individual speed distribution area 40, an allowable upper limit $V_{lim}$ of the relative speed is respectively determined at each of points around the preceding vehicle 3. The relative speed of the controlled vehicle 1 with respect to the preceding vehicle 3 is restricted within the allowable upper limit $V_{lim}$ in the individual speed distribution area 40 when the driving assistance system is activated.

The individual speed distribution area 40 is determined such that the allowable upper limit of the relative speed is made lower as the lateral distance and the longitudinal distance from the preceding vehicle 3 become smaller (as the controlled vehicle 1 approaches the preceding vehicle 3). In addition, in FIG. 3, for ease of comprehension, there are shown iso-relative speed lines which are drawn by connecting points of the same allowable upper limit. Respective ones of the iso-relative speed lines a, b, c and d corresponds to respective ones of the allowable upper limits $V_{lim}$ of 0 km/h, 20 km/h, 40 km/h and 60 km/h.

Further, in FIG. 3, the individual speed distribution area 40 of the allowable upper limit up to 60 km/h is depicted, but the individual speed distribution area 40 may be determined up to a larger relative speed considering a case where the controlled vehicle 1 passes an oncoming vehicle travelling in the opposite direction on the oncoming lane.

Figure 4:
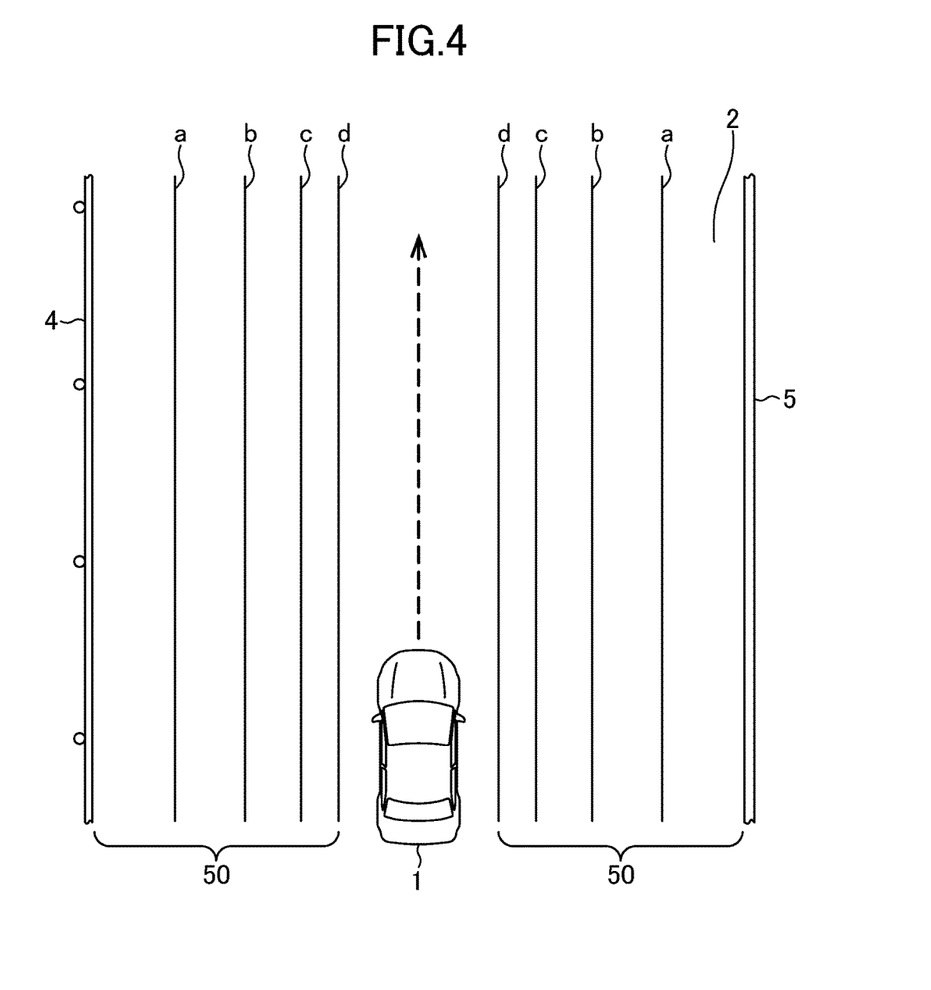
FIG. 4 is an explanatory diagram of a individual speed distribution area determined with respect to a guardrail or the like when a vehicle control system according to one embodiment of the present invention is under normal travelling condition.

In addition, in the present embodiment, the individual speed distribution area is determined also for objects other than the preceding vehicle 3. In FIG. 4, description will be made on an individual speed distribution area 50 determined with respect to a guard rail and/or a lane border line.

FIG. 4 is an explanatory diagram of the individual speed distribution area 50 determined with respect to a guardrail or the like when the vehicle control system 100 according to the present embodiment is under normal travelling condition. FIG. 4 depicts a case where a guardrail 4 and a lane border line 5 are provided along the travelling lane 2. It may be considered that these objects extend in a longitudinal direction along the travelling lane 2, and are comprised only of a side surface (lateral surface), or of small objects being sequentially arranged in the longitudinal direction. Thus, in the individual speed distribution area 50 determined with respect to such objects, iso-relative speed lines a-d are determined also to extend along the travelling lane 2. Therefore, the controlled vehicle 1 is allowed to travel at a high speed along a center of the travelling lane 2, but its speed is limited to a lower speed as it approaches an end of the travelling lane 2.

Here, the individual speed distribution areas 40, 50 may be determined based on various parameters. As the parameters, for example, the relative speed of the controlled vehicle 1 and the object, the type of the object, the travelling direction of the controlled vehicle 1, the travelling direction and the moving speed of the object, length of the object, the absolute speed of the controlled vehicle 1 or the like may be considered. That is, the factor k and the safety distance $D_0$ may be selected based on these parameters.

Thus, the individual speed distribution areas 40, 50 may be determined for various objects. The object can include a vehicle, a pedestrian, a bicycle, a travelling path partition, an obstacle, a traffic signal, a traffic sign or the like, for example. The vehicle may be distinguishable between an automobile, a truck, and a motor bicycle. The pedestrian may be categorized to an adult, a child and a group. The travelling path partition may include a guardrail, a shoulder forming a step at a transverse end of the travelling path, a center median, and a lane border line. The obstacle may include a scarp, a trench, a hole and a fallen object. The traffic sign may include a halt line and a halt sign.

According to the present embodiment, further, in the controlled vehicle 1, when an automatic follow-up mode where the vehicle automatically follows the preceding vehicle is selected, a speed distribution area 60 is determined between an object vehicle 6 and the controlled vehicle 1, wherein the preceding vehicle to be automatically followed by the controlled vehicle 1 is determined as the object vehicle 6.

Figure 5:
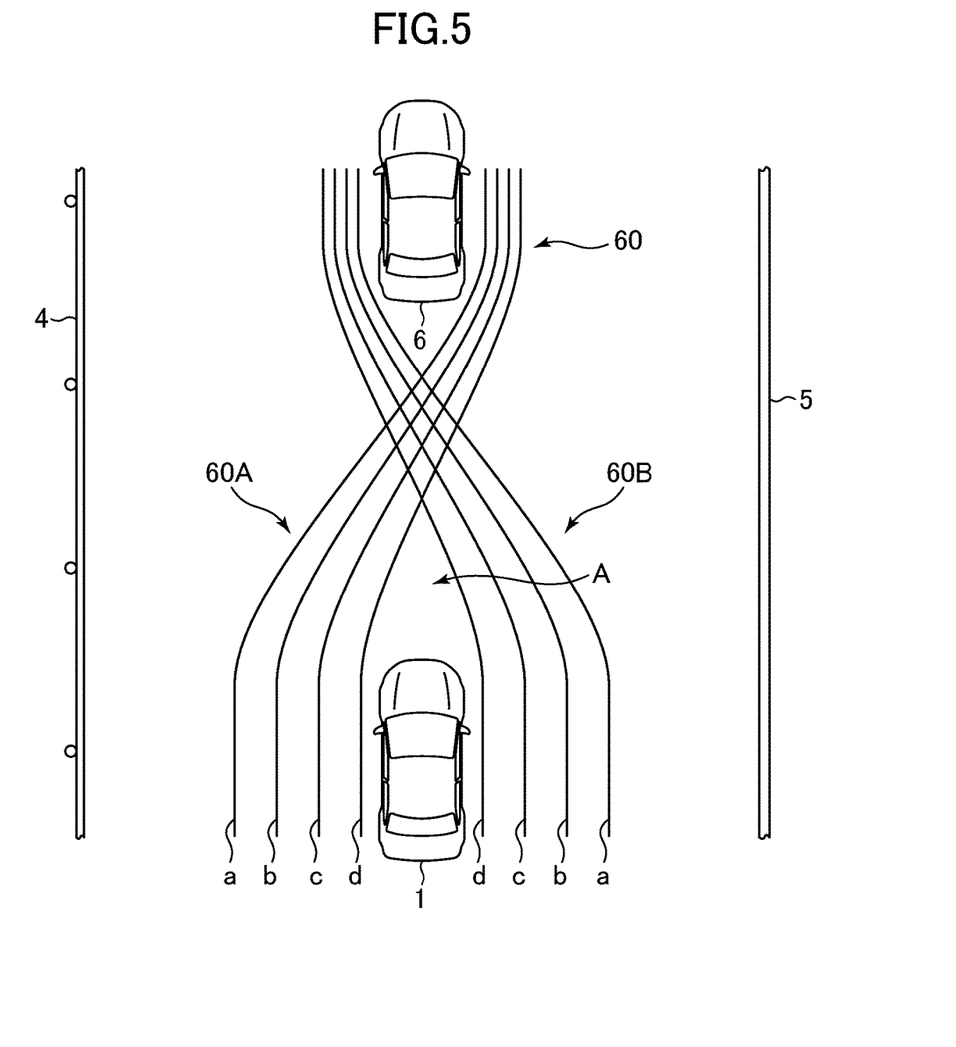
FIG. 5 is an explanatory diagram of a speed distribution area determined with respect to an object vehicle when a vehicle control system according to one embodiment of the present invention is under an automatic follow-up mode.

FIG. 5 is an explanatory diagram of the speed distribution area 60 determined with respect to the object vehicle when the vehicle control system 100 according to the present embodiment is under the automatic follow-up mode. In the example depicted in FIG. 5, the controlled vehicle 1 is travelling along the travelling lane 2 between the guardrail 4 and the lane border line 5, and the preceding vehicle is travelling ahead. The vehicle control system 100 is configured to perform an automatic follow-up control relative to the object vehicle 6, determining the preceding vehicle as the object vehicle 6.

As depicted in FIG. 5, the speed distribution area 60 has a first speed distribution area 60A defined such that the same allowable upper limit $V_{lim}$ extends from one side of the object vehicle 6 in the lateral direction (right side 6R in FIG. 5) through an area A between the controlled vehicle 1 and the object vehicle 6 to the other side of the controlled vehicle 1 in the lateral direction (left side 1L in FIG. 5). In addition, the speed distribution area 60 has a second speed distribution area 60B defined such that the same allowable upper limit $V_{lim}$ extends from the other side of the object vehicle 6 in the lateral direction (left side 6L in FIG. 5) through the area A between the controlled vehicle 1 and the object vehicle 6 to the one side of the controlled vehicle 1 in the lateral direction (right side 1R in FIG. 5).

The first speed distribution area 60A and second speed distribution area 60B are made by combining the individual speed distribution area 40 determined with respect to the object vehicle 6 and the individual speed distribution area 50 determined with respect to the guard rail 4 and the lane border line 5. Specifically, the first speed distribution area 60A is determined by smoothly connecting the speed distribution of one side (right side 6R) in the lateral direction of the individual speed distribution area 40 determined with respect to the object vehicle 6 and the speed distribution of the individual speed distribution area 50 determined with respect to the guardrail 4.

Similarly, the second speed distribution area 60B is determined by smoothly connecting the speed distribution of the other side (left side 6L) in the lateral direction of the individual speed distribution area 40 determined with respect to the object vehicle 6 and the speed distribution of the individual speed distribution area 50 determined with respect to the lane border line 5.

With such settings, the first speed distribution area 60A and the second speed distribution area 60B are determined such that, in the areas 6R, 6L in the lateral direction of the object vehicle 6, the allowable upper limit $V_{lim}$ is made lower as the lateral distance from the object vehicle 6 become smaller, in the area A between the controlled vehicle 1 and the object vehicle 6, the allowable upper limit $V_{lim}$ is made lower as a distance from the object vehicle 6 becomes smaller in a forward or rearward direction, and in the areas 1R, 1L in the lateral direction of the controlled vehicle 1, the allowable upper limit $V_{lim}$ is made lower as the lateral distance from the controlled vehicle 1 becomes larger, that is, the lateral distance from the guardrail 4 or the lane border line 5 becomes smaller. In the example of FIG. 5, for ease of comprehension, there are shown iso-relative speed lines which are drawn by connecting points of the same allowable upper limit. Respective ones of the iso-relative speed lines a, b, c and d correspond to respective ones of the allowable upper limits $V_{lim}$ of 0 km/h, 10 km/h, 20 km/h, and 30 km/h.

According to the present embodiment, the system is further configured such that, when a trigger input is detected with the automatic follow-up mode being selected, either one of the settings of the first speed distribution area 60A or the second speed distribution area 60B area is canceled.

Figure 6:
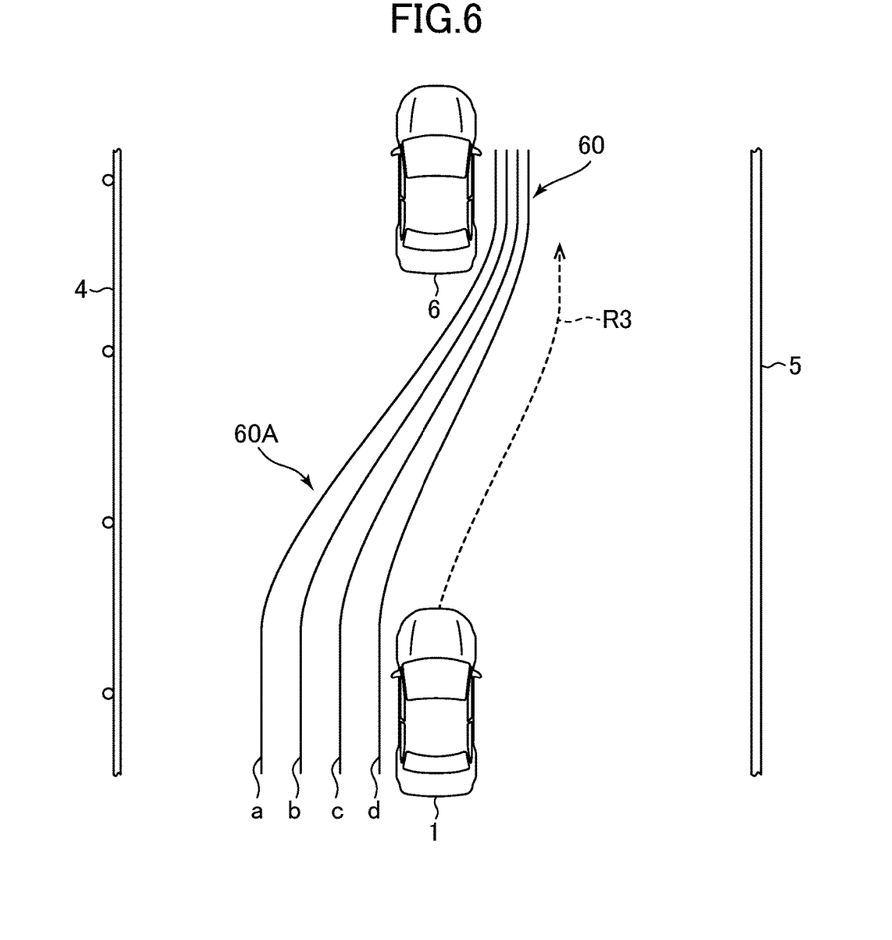
FIG. 6 is an explanatory diagram of a speed distribution area determined with respect to an object vehicle in a case where a trigger is input to a vehicle control system when the vehicle control system according to one embodiment of the present invention is under an automatic follow-up mode.

FIG. 6 is an explanatory diagram of the speed distribution area 60 determined with respect to the object vehicle 6 in a case where a trigger is input to the ECU 10 when the vehicle control system 100 according to the present embodiment is under the automatic follow-up mode. For example, at the automatic follow-up mode, if the driver operates a direction indicator to light (to blink) the right direction indicator, the ECU 10 detects the operation as the trigger input, and judges that the driver is intending to pass or overtake the object vehicle 6 from the right side, and as depicted in FIG. 6, cancels the setting of the second speed distribution area 60B among the first speed distribution area 60A and the second speed distribution area 60B. As a result, only the first speed distribution area 60A is set in the speed distribution area 60.

Further, the trigger may include, in addition to the operation of the direction indicator by the driver, an accelerator operation by the driver intending to accelerate the controlled vehicle 1, a steering operation for more than a predetermined angle, a detection of a lateral movement (offset) with respect to the controlled vehicle 1 for more than a predetermined distance as a result of a left or right turn or a lane change by the object vehicle 6.

Figure 7:
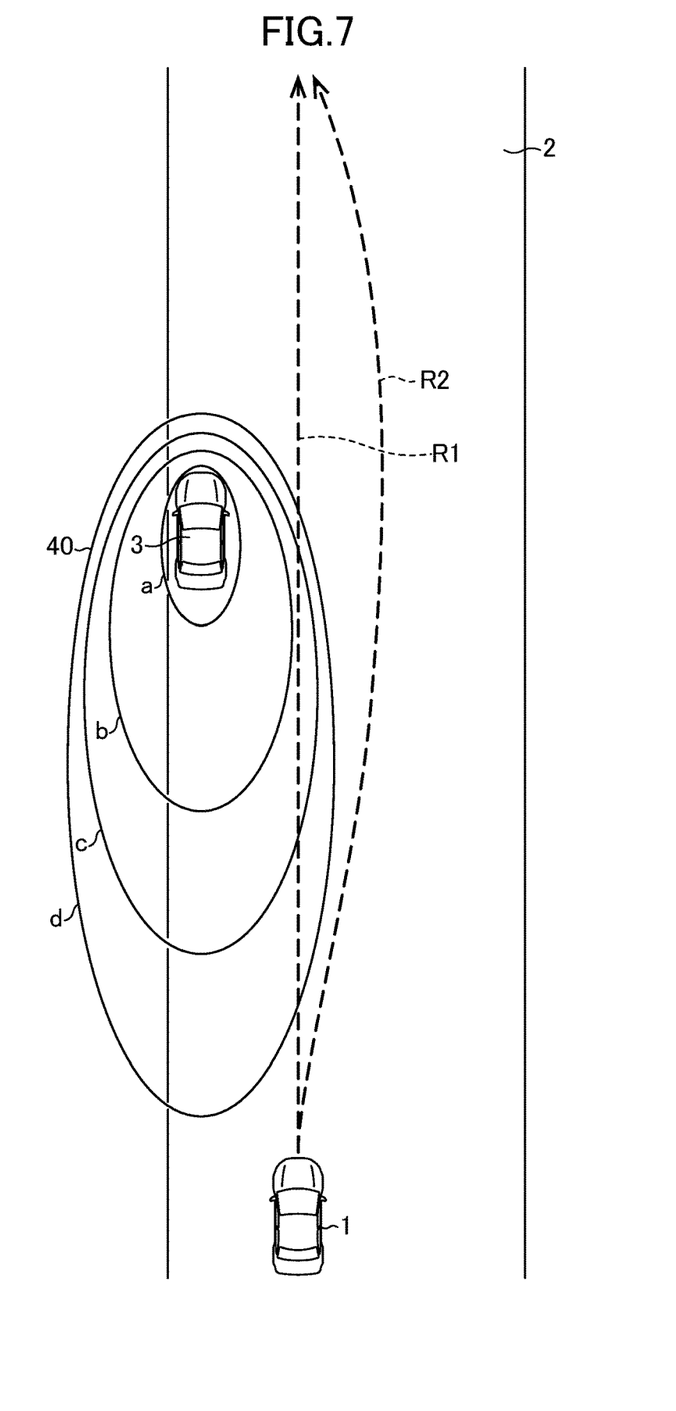
FIG. 7 is an explanatory diagram of an operation when a vehicle control system according to one embodiment of the present invention is under normal travelling condition.
Figure 8:
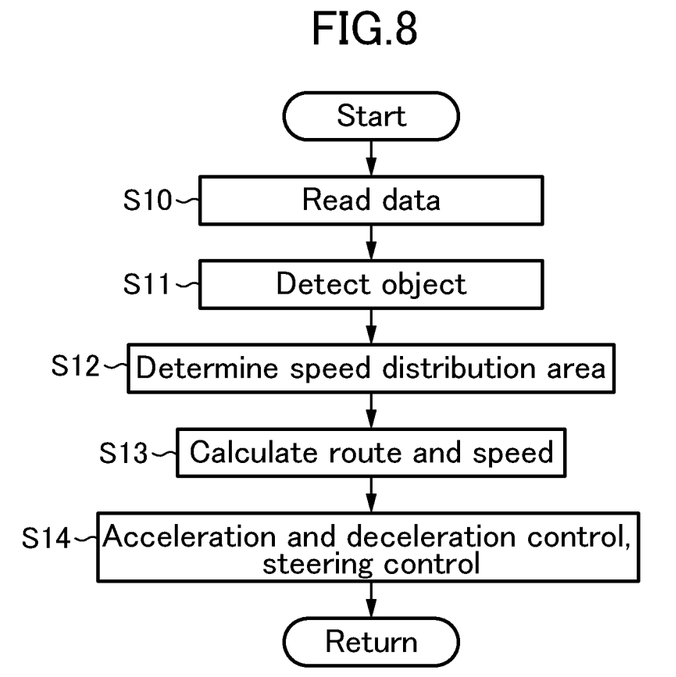
FIG. 8 is a process flow depicting when the vehicle control system according to one embodiment of the present invention is under normal travelling condition.

Subsequently, with respect to FIGS. 7 and 8, description will be made on a flow of the process when the vehicle control system according to the present embodiment is under normal travelling condition. FIG. 7 is an explanatory diagram of an operation when the vehicle control system 100 is under normal travelling condition, and FIG. 8 is a process flow when the vehicle control system is under normal travelling condition.

As depicted in FIG. 7, when the controlled vehicle 1 is travelling on the travelling lane, the ECU 10 (data acquisition part) of the controlled vehicle 1 acquires various data from a plurality of sensors (S10). Specifically, the ECU 10 receives image data from the car-mounted camera 21, the image data representing an image of the front area of the vehicle 1 taken by the car-mounted camera 21, and receives measurement data from the millimeter-wave radar 22.

The ECU 10 (object detection part) detects the object by processing the data acquired from exterior sensors including at least the car-mounted camera 21 (S11). Specifically, the ECU 10 detects the parked vehicle 3 as the object by executing an image processing of the image data. At this time, the type of the objects (in this case, the vehicle 3) is specified. In addition, the ECU 10 can detect the presence of a specific obstacle from the map information.

Further, the ECU 10 (position and relative speed calculation part) calculates the position and the relative speed of the detected objects (parked vehicle 3) with respect to the controlled vehicle 1 based on the measurement data. Further, the position of the object includes a y direction position (longitudinal distance) along the travelling direction of the controlled vehicle 1, and an x direction position (lateral distance) along the lateral direction orthogonal to the travelling direction. For the relative speed, the relative speed included in the measurement data may be used directly, or a velocity component along the travelling direction may be calculated from the measurement data. In addition, the velocity component perpendicular to the travelling direction may not necessarily be calculated, but may be estimated from the plurality of measurement data and/or the plurality of image data, if necessary.

The ECU 10 (speed distribution area determining part) determines an individual speed distribution area 40 for the detected object (specifically, the vehicle 3). In addition, the ECU 10 (route calculation part) calculates the route where the controlled vehicle 1 may be able to travel, as well as a specified vehicle speed or a target speed at each of the positions on the route, depending on a predetermined mode, based on the determined individual speed distribution area 40 (S13).

In order for the controlled vehicle 1 to travel on the calculated route, the ECU 10 (avoidance control executing part) executes an avoidance control as in the followings depending on the predetermined mode (S14).

Further, the controlled vehicle 1 is configured such that the driver can select a desired drive assist mode using an input device not shown. Further, a predetermined mode may be set in the ECU 10 in advance. In addition, the process flow of FIG. 8 is repeatedly executed at every predetermined time (for example, 0.1 second), so that the calculated route and the specified speed on the route changes with time.

Here, referring to FIG. 7, description will be made on a case where the calculated routes are the routes R1 and R2.

The route R1 is a straight travelling route. The route R1 is calculated when a straight traveling prioritized mode (or a shortest distance prioritized mode) is selected. The route R1 crosses the iso-relative speed lines d, c and d of the individual speed distribution area 40. Therefore, when the controlled vehicle 1 travels on the route R1, the allowable upper limit of the relative speed in the travelling direction is changed on the route R1. Specifically, the allowable upper limit is once made lower and then made higher (the individual speed distribution area 40).

For example, if the controlled vehicle 1 enters the route R1 at a relative speed at or higher than 60 km/h, even if the driver maintains the same depressed or actuated position of the accelerator, the speed of the controlled vehicle 1 is automatically controlled under the action of the avoidance control when the controlled vehicle 1 enters into an area further below the iso-relative speed line d (corresponding to 60 km/h). Specifically, unless the driver decreases the depressed or actuated amount of the accelerator to decelerate the vehicle to achieve the relative speed at a value of or less than the allowable upper limit, the relative speed of the controlled vehicle 1 is maintained at the allowable upper limit at each of the points. In this condition, when the controlled vehicle 1 enters the route R1 for example at the relative speed of 40 km/h, the relative speed is maintained at 40 km/h (not accelerated or decelerated) until the vehicle enters the iso-relative speed line c (corresponding to 40 km/h) if the accelerator depressed or actuated amount is not decreased.

Further, in the aforementioned case, when an automatic steering mode is selected in addition to the straight travelling prioritized mode, the controlled vehicle 1 may be decelerated as the controlled vehicle 1 approaches the parked vehicle 3, and then accelerated to the selected speed. In order to execute such avoidance control, the ECU 10 performs an acceleration and deceleration control by outputting respective ones of the engine output change request signal and the brake request signal to respective ones of the engine control system 31 and the brake control system 32.

On the other hand, the route R2 is a route which passes outside the iso-relative speed line d of the individual speed distribution area 40. The route R2 is calculated when a speed prioritized mode which is a mode suppressing a traveling speed reduction mode is selected. In the present embodiment, since the allowable upper limit on the route R2 is at least larger than the relative speed of 60 km/h, if the controlled vehicle 1 has its path changed by the driver's operation of the steering wheel to enter the route R2 at the speed of 60 km/h (absolute speed), the vehicle travels on the route R2 at a vehicle speed according to the driver's depressed or actuated amount of the accelerator. Therefore, during travelling on the route R2, the ECU 10 does not output any of the engine output change request signal and/or the brake request signal, and thus, the controlled vehicle 1 travels at the vehicle speed according to the depressed or actuated amount of the accelerator.

Further, in the aforementioned case, when the automatic steering mode is selected in addition to the speed prioritized mode, the ECU 10 outputs the steering direction change request signal to the steering control system 33. The controlled vehicle 1 thereby travels on the route R2. At this time, the controlled vehicle 1 travels at a traveling speed according to the depressed or actuated amount of the accelerator, so that the engine output change request signal and/or the brake request signal are not output from the ECU 10.

Here, the route R2 is a route calculated when the relative speed of the controlled vehicle 1 is 60 km/h, therefore it is calculated as a route to pass along the outside the iso-relative speed line d (corresponding to 60 km/h) of the individual speed distribution area 40. However, when the relative speed of the controlled vehicle 1 is 40 km/h, for example, another route may be calculated to pass along the outside the iso-relative speed line c (corresponding to 40 km/h) of the individual speed distribution area 40.

Figure 9:
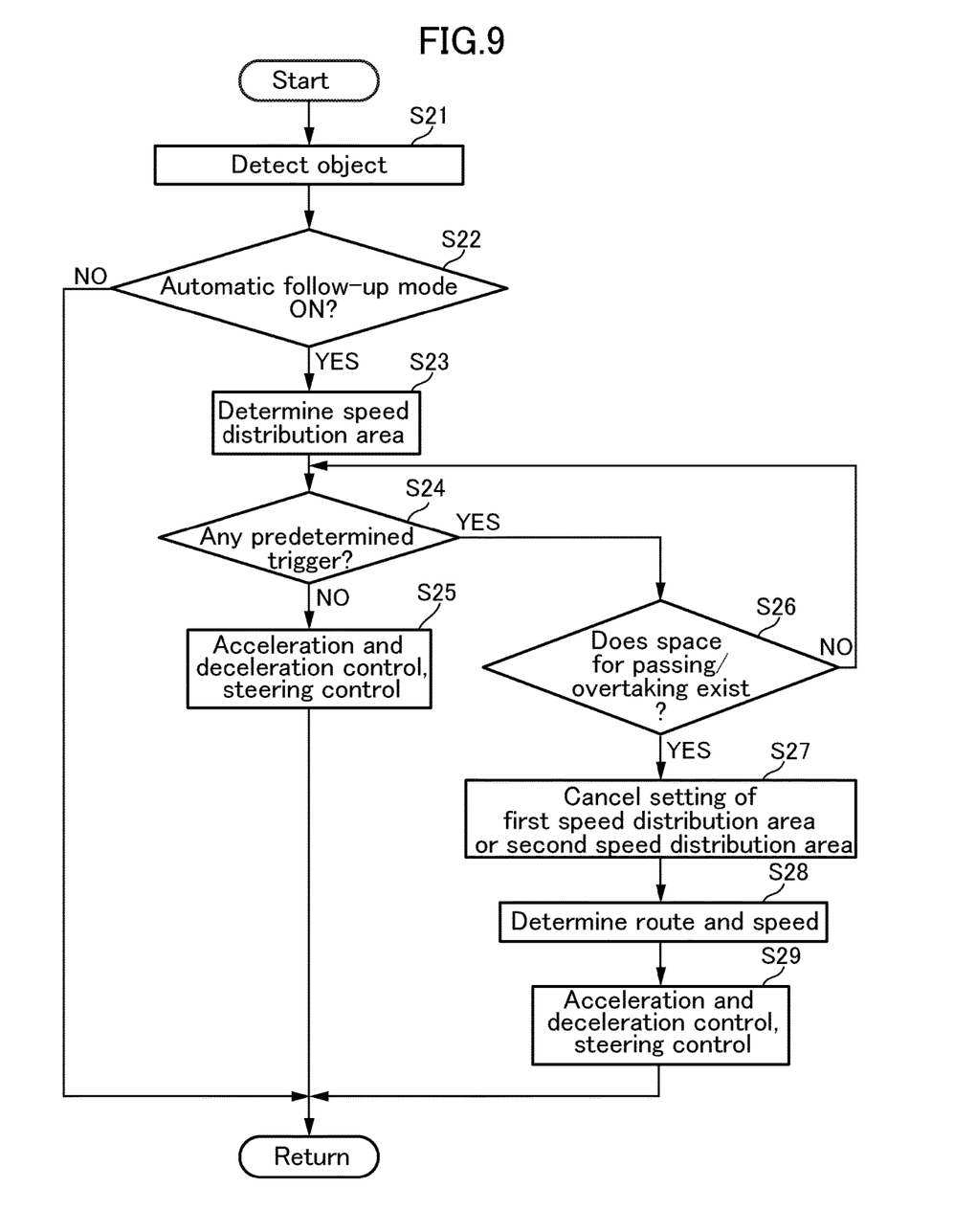
FIG. 9 is a process flow depicting when the vehicle control system according to one embodiment of the present invention is under an automatic follow-up mode.

Subsequently, with reference to FIG. 9 in addition to the aforementioned FIGS. 5 and 6, description will be made on the flow of the process when the vehicle control system according to the present embodiment is under the automatic follow-up. FIG. 9 is a process flow when the vehicle control system according to the present embodiment is under the automatic follow-up mode.

As depicted in FIG. 9, when the controlled vehicle 1 is travelling on the traveling lane, if the ECU 10 detects the preceding vehicle as the object vehicle 6 (S21), the ECU 10 determines whether the automatic follow-up mode to control the controlled vehicle 1 to automatically follow the preceding vehicle (S22) is selected. If the automatic follow-up mode is selected, the ECU 10 determines the first speed distribution area 60A and the second speed distribution area 60B as depicted in FIG. 5, determining the preceding vehicle as the object vehicle 6 (S23). Subsequently, the ECU 10 determines whether there has been an input of a predetermined trigger, such as an operation of the direction indicator by the driver (S24). When there is no input of the predetermined trigger, the ECU 10 performs the acceleration and deceleration control and a steering control for performing the automatic follow-up control.

Specifically, the ECU 10 outputs respective ones of the engine output change request signal and the brake request signal to respective ones of the engine control system 31 and the brake control system 32 in order to control the speed of the controlled vehicle 1 such that the speed is restricted not to exceed the allowable upper limit at the point where the controlled vehicle 1 is positioned. In addition, the ECU 10 outputs the steering direction change request signal to the steering control system 33 to steer the controlled vehicle 1 to a position where the speed of the controlled vehicle 1 becomes below the allowable upper limit.

Here, the speed distribution area 60 has the first speed distribution area 60A and the second speed distribution area 60B, and as depicted in FIG. 5, in the speed distribution area 60, there exists a region where both of the areas 60A and 60B overlap, but among values of the allowable upper limit determined by the first speed distribution area 60A and the second speed distribution area 60B, the ECU 10 adopts the smaller one as the allowable upper limit.

In addition, the iso-relative speed line a of each of the first speed distribution area 60A and the second speed distribution area 60B corresponds to 0 km/h, and the controlled vehicle 1 does not travel beyond the iso-relative speed line a. Thus, when the ECU 10 is performing the automatic follow-up control, the controlled vehicle 1 is controlled such that it is always positioned inside the area surrounded by the iso-relative speed line a of each of the first speed distribution area 60A and the second speed distribution area 60B. Therefore, the controlled vehicle 1 may automatically follow the object vehicle 6 within a range of a predetermined lateral width with respect to the object vehicle 6.

In step 24, for example, when there is a driver's operation of the direction indicator, the ECU 10 determines that a predetermined trigger is input, and determines whether there is a sufficient space for passing between the object vehicle 6 and the guardrail 4 or the lane border line 5 (S26). If there is a space for passing, the ECU 10 cancels the setting of the first speed distribution area 60A or the second speed distribution area 60B (S27).

More specifically, for example, if the driver operates to light (to blink) the right side direction indicator, the ECU 10 judges that the driver is intending to pass or overtake the object vehicle 6 at the right side thereof, and determines whether there is a space for the passing the area between the object vehicle 6 and the lane border line 5. Then, if it is determined that such space exists, the ECU 10 cancels the setting of the automatic follow-up control and also the setting of the second speed distribution area 60B. The speed distribution area 60 at this point is in a condition where only the first speed distribution area 60A is determined as depicted in FIG. 6.

Subsequently, the ECU 10 calculates the route where the controlled vehicle 1 may be able to travel, as well as a specified vehicle speed or a target speed at each of the positions on the route (S28), and performs the acceleration/deceleration control and the steering control (S29) so that the controlled vehicle 1 travels the route at a predetermined vehicle speed.

Here, as the route where the vehicle may travel, a route R3 is shown in FIG. 6, for example. The route R3 is located at a position further outside the iso-relative speed line d (corresponding to 30 km/h), and when the controlled vehicle 1 is traveling such that the relative speed to the object vehicle 6 is 20 km/h, for example, the relative speed of the controlled vehicle 1 does not exceed the allowable upper limit determined by the first speed distribution area 60A. Therefore, the ECU 10 steers the controlled vehicle 1 along the route R3 to pass or overtake the object vehicle 6 with the speed of the controlled vehicle 1 maintained. To perform such control, the ECU 10 outputs the steering direction change request signal to the steering control system 33.

Further, when travelling on the route R3, the path may be changed along the route R3 by the driver's actuation of the steering wheel, or the route R3 may be travelled on at the vehicle speed according to the driver's depressed or actuated amount of the accelerator. In this case, the ECU 10 outputs the engine output change request signal and/or the brake request signal to restrict the vehicle speed of the controlled vehicle 1 from exceeding the allowable upper limit determined in the first speed distribution area 60A while travelling on the route R3.

Subsequently, the operation of the vehicle control system (ECU) 10 according to the present embodiment will be described.

In the present embodiment, the speed distribution area 60 is determined between the detected object vehicle 6 and the controlled vehicle 1. The speed distribution area 60 has the first speed distribution area 60A defined such that the same allowable upper limit of relative speed extends from the right side area 6R of the object vehicle 6 through the area A between the controlled vehicle 1 and the object vehicle 6 to the left side area 1L of the controlled vehicle 1, and the second speed distribution area 60B defined such that the same allowable upper limit of relative speed extends from the left side area 6L of the object vehicle 6 to the right side area 1R of the controlled vehicle 1. In addition, the ECU 10 controls the controlled vehicle 1 such that the relative speed of the controlled vehicle 1 is restricted from exceeding the allowable upper limit determined for the speed distribution area 60.

Therefore, the ECU 10 can determine an appropriate allowable upper limit for the left side and right side areas of the controlled vehicle 1 according to its position, determine an appropriate allowable upper limit when the controlled vehicle 1 travels behind the object vehicle 6 in the area A between itself and the object vehicle 6, and determine an appropriate allowable upper limit for the controlled vehicle 1 for the right side and the left side areas of the object vehicle 6 in the right side and the left side areas of the object vehicle 6. Thus, according to the present embodiment, by controlling the controlled vehicle 1 within the allowable upper limit in accordance with the first speed distribution area 60A and the second speed distribution area 60B, it is possible to provide the safe driving assistance through a simple and efficient speed control.

The first speed distribution area 60A and the second speed distribution area 60B are determined such that, in the area in the lateral direction of the object vehicle 6, the allowable upper limit is made lower as the lateral distance from the object vehicle 6 becomes smaller, in the area A between the controlled vehicle 1 and the object vehicle 6, the allowable upper limit is made lower as the forward or rearward distance from the object vehicle 6 becomes smaller, and in the area in the lateral direction of the controlled vehicle 1, the allowable upper limit is made lower as the lateral distance from the controlled vehicle 1 becomes larger.

In the left and right side areas of the object vehicle 6, a large relative speed is determined as the upper limit at a position further away from the object vehicle 6, but at a position closer to the object vehicle 6, the upper limit of the vehicle speed is determined such that the relative speed becomes smaller. Therefore, when the controlled vehicle 1 is positioned lateral to the object vehicle 6, a safe distance and speed can be kept between the object vehicle 6 and the controlled vehicle 1.

In addition, when the controlled vehicle 1 travels in an environment where a wide space is left on the left or right side of the controlled vehicle 1, that is, where the distance from the guardrail 4 and/or the lane border line 5 is large, a larger upper limit of the relative speed is allowed, but when the controlled vehicle 1 travels in an environment where only a narrow space is left on the left or right side of the controlled vehicle 1, that is, where the distance from the guardrail 4 and/or the lane border line 5 is small, the upper limit of the vehicle speed is limited to make the relative speed lower. Therefore, it is possible to travel keeping the safe distance and speed with respect to the guardrail 4 and/or the lane border line 5.

Further, when the controlled vehicle 1 travels with a further distance in forward or rearward direction from the object vehicle 6, a larger upper limit of the relative speed is allowed, but when the controlled vehicle 1 travels closer to the object vehicle 6 in forward or rearward direction, the upper limit of the vehicle speed is limited to make the relative speed lower. Therefore, when the controlled vehicle 1 travels behind the object 6, it is possible to travel keeping the safe distance and speed with respect to the object vehicle 6.

According to the present embodiment, the speed distribution area 60 has the first speed distribution area 60A and the second speed distribution area 60B, and thus speed distribution areas are determined on both sides of the controlled vehicle 1 and the object vehicle 6. Therefore, if controlling the controlled vehicle 1 such that it is always positioned inside the predetermined speed distribution area, for example, it is possible to perform the follow-up control wherein the controlled vehicle 1 automatically follows the object vehicle 6.

According to the present embodiment, the ECU 10 restricts the controlled vehicle 1 from exceeding the allowable upper limit which is smaller one of those defined by the first speed distribution area 60A and the second speed distribution area 60B, so that it is possible to provide a safer driving assistance.

According to the present embodiment, in the avoidance control (S14) or the follow-up control (S25, S29), the speed and/or the steering direction of the controlled vehicle 1 is changed to restrict the relative speed of the controlled vehicle 1 in the individual speed distribution area 40 or the speed distribution area 60 so that the allowable upper limit is not exceeded. In carrying out this avoidance control, control may be made to change (decelerate) the speed itself of the controlled vehicle 1 as in the case of the route R1 of FIG. 7, or to change the travelling path by changing the steering direction to pass an area with a larger allowable upper limit as in the case of the route R3, or even to change both of the speed and the steering direction as in the case of the route R2.

According to the present embodiment, in order to execute the avoidance control, the route of the controlled vehicle 1 is calculated based on the individual speed distribution areas 40, 50 or the speed distribution area 60, so that it is possible for the controlled vehicle 1 to travel on a safe route with respect to the object and/or the object vehicle 6.

According to the present embodiment, as depicted in FIG. 2, the individual speed distribution areas 40, 50 and the speed distribution area 60 are determined such that the allowable upper limit is zero at a position apart from the object by a predetermined safe distance Do. Thus, according to the present embodiment, the controlled vehicle 1 can only approach up to a position apart from the object and/or the object vehicle 6 by the safe distance Do. Therefore, according to the present embodiment, even if the object and/or the object vehicle 6 suddenly move in a direction approaching the controlled vehicle 1, it is possible to prevent the controlled vehicle 1 and the object and/or the object vehicle 6 from contacting with each other.

According to the present embodiment, when a trigger signal is input, such as a case wherein the driver operates to turn on the right side direction indicator, for example, the ECU 10 cancels the setting of the second speed distribution area 60B, so that in this case, the restriction by the allowable upper limit is removed on the right side of the controlled vehicle 1, and thus the controlled vehicle 1 can travel at a larger relative speed on the right side area of the controlled vehicle 1. It is thereby possible to perform a passing control where the controlled vehicle 1 passes the object vehicle 6. Also in this case, the setting of the first speed distribution area 60A is maintained, so that it is possible to travel with the safety distance and the relative speed being maintained with respect to the object vehicle 6 at the time of passing.

The present invention is not limited to the aforementioned embodiments, and it may have aspects as in the followings, for example.

According to the aforementioned embodiments, the speed distribution area 60 is defined by connecting or integrating the individual speed distribution area 40 determined with respect to the object vehicle 6 and the individual speed distribution area 50 determined with respect to the guardrail 4 and/or the lane border line 5, but the invention is not limited to such embodiments but, for example, the speed distribution area 60 for the area in the lateral direction of the controlled vehicle 1 may not necessarily be determined based on the individual distribution area 50 of the guardrail 4 and/or the lane border line 5, and the speed distribution area 60 may be determined in the lateral direction of the controlled vehicle 1 independently from the individual speed distribution area 50. In addition, with respect to the speed distribution area 60 for the area in the lateral direction of the object vehicle 6, for example, it may also not necessarily be determined based on the individual speed distribution area 40 which is determined with respect to the object vehicle 6, and the speed distribution area 60 may be determined in the area in the lateral direction of the object vehicle 6 independently from the individual speed distribution area 40.

According to the aforementioned embodiment, the speed distribution area 60 has been defined as including both the first speed distribution area 60A and the second speed distribution area 60B, but the present invention is not limited to such feature, but it is possible that the speed distribution area 60 has either one of the first speed distribution area 60A or the second speed distribution area 60B. For example, there may be a case wherein there is no need to take into account the speed limit as far as one side of the vehicle is concerned, because a sufficient space can be ensured as there is no guardrail or the like on this side of the vehicle, or a case wherein the controlled vehicle 1 is only under control for passing the object vehicle 6, but not under the follow-up control where the controlled vehicle 1 automatically follows the object vehicle 6.

At the time of normal travelling condition, the individual speed distribution areas 40, 50 are determined with respect to the object vehicle 6 and/or the object (the guardrail 4, the lane border line 5 or the like) for controlling the travelling, but it is not necessarily required to perform such control at the time of normal travelling condition. According to the present invention, the speed distribution area may be determined at least when the follow-up control where the controlled vehicle 1 automatically follows the object vehicle 6 is performed, or when the passing control is performed for having the controlled vehicle 1 pass the object vehicle 6.

LIST OF REFERENCE SIGNS

1, 3: vehicle
2: travelling lane
4: guardrail

5: lane border line
6: object vehicle
10: ECU
21: car-mounted camera
22: millimeter-wave radar
23: vehicle speed sensor
24: positioning system
25: navigation system
31: engine control system
32: brake control system
33: steering control system
40, 50: individual speed distribution area
60: speed distribution area
60A: first speed distribution area
60B: second speed distribution area
100: vehicle control system
a, b, c, d: iso-relative speed line
$D_0$: safe distance
X: distance
R1, R2, R3: route

The invention claimed is:

1. A vehicle control system mounted on a controlled vehicle; the system being configured to carry out a control for;
   detecting an object vehicle which presents ahead of the controlled vehicle,
   determining a speed distribution area which defines a distribution of an allowable upper limit of a relative speed of the controlled vehicle with respect to the object vehicle in the travelling direction of the controlled vehicle, and
   executing an avoidance control for restricting the relative speed of the controlled vehicle with respect to the object vehicle from exceeding the allowable upper limit in the speed distribution area,
   wherein the speed distribution area has a first speed distribution area defined such that the same allowable upper limit extends from an area on one side of the object vehicle in a lateral direction through an area between the controlled vehicle and the object vehicle to an area on the other side of the controlled vehicle in a lateral direction.

2. The vehicle control system as recited in claim 1, wherein the first speed distribution area is determined such that, in the area on the one side of the object vehicle, the allowable upper limit is made lower as a lateral distance from the object vehicle becomes smaller, in the area between the vehicle and the object vehicle, the allowable upper limit is made lower as a forward or rearward distance from the object vehicle becomes smaller, and in the area on the other side of the vehicle, the allowable upper limit is made lower as a lateral distance from the controlled vehicle becomes larger.

3. The vehicle control system as recited in claim 1, wherein, in the avoidance control, a speed and/or a steering direction of the controlled vehicle is changed such that the relative speed of the vehicles in the speed distribution area does not exceed the allowable upper limit.

4. The vehicle control system as recited in claim 1, wherein, in the avoidance control, a route of the vehicle is calculated based on the speed distribution areas.

5. The vehicle control system as recited in claim 1, wherein the speed distribution area is determined such that the allowable upper limit is zero at a position apart from the object vehicle by a predetermined safe distance.

6. The vehicle control system as recited in claim 1, which further comprises a second speed distribution area defined such that the same allowable upper limit extends from an area on the other side of the object vehicle in a lateral direction through an area between the controlled vehicle and the object vehicle to an area on the one side of the controlled vehicle extending in a lateral direction.

7. The vehicle control system as recited in claim 1, wherein the second speed distribution area is determined such that, in the area on the other side of the object vehicle, the allowable upper limit is made lower as a lateral distance from the object vehicle is smaller, in the area between the controlled vehicle and the object vehicle, the allowable upper limit is made lower as a forward or rearward distance from the object vehicle is smaller, and in the area on the one side of the controlled vehicle, the allowable upper limit is made lower as a lateral distance from the vehicle is larger.

8. The vehicle control system as recited in claim 7, wherein in the avoidance control, the controlled vehicle is restricted from exceeding the allowable upper limit which is smaller one of the limits defined by the first speed distribution area and the second speed distribution area.

9. The vehicle control system as recited in claim 7 wherein when an input trigger is detected, either one of the settings of the first speed distribution area or the second speed distribution area is canceled depending on a content of the trigger.

10. The vehicle control system as recited in claim 9 wherein, the trigger includes at least one of an operation of a direction indicator by a driver of the controlled vehicle, an accelerator operation, a steering operation, and a lateral movement of the object vehicle with respect to the vehicle for more than a predetermined distance.

* * * * *